Patented Dec. 10, 1929

1,738,740

UNITED STATES PATENT OFFICE

JOHN P. TRICKEY, OF EVANSTON, AND CARL S. MINER, OF CHICAGO, ILLINOIS, ASSIGNORS TO THE QUAKER OATS COMPANY, OF CHICAGO, ILLINOIS, A CORPORATION OF NEW JERSEY

DISINFECTANT AND ANTISEPTIC EMBODYING FURANE DERIVATIVES AND PROCESS FOR MAKING AND UTILIZING SAME

No Drawing.  Application filed August 23, 1924. Serial No. 733,763.

Our invention relates to improved disinfecants and antiseptics which may embody furane derivatives and also to improved methods and processes for treating and utilizing furane derivatives.

Certain furane derivatives such as furfural possess strongly germicidal, bactericidal, and fungicidal properties. The vapor of furfural is very effective as a disinfectant and antiseptic if properly utilized and accordingly one purpose of our present invention is to provide means for liberating such vapors in close proximity to the organic or other material which is to be preserved by the treatment thus insuring substantially the maximum efficiency in their use. A further object of our invention is to provide a process and means for efficiently liberating vapors of furane derivatives having disinfecting and antiseptic properties at a gradual and controlled rate and over a substantial period of time.

A further aim of our invention is the provision of certain furane derivatives such as furfuramide and furfurine in a dry powdered form which is not subject to undesirable changes during storage and use. Under ordinary conditions of storage powdered furfuramide and furfurine sometimes become caked or transformed into solid masses, but by our invention this condition is avoided and materials in a relatively stable and desirable form for use as disinfectants and germicides are provided.

Another object of our invention is to provide means for using such powdered or finely divided material as an intiseptic or germicide in a form such that the active material will be present only in the desired concentration, and such that when vapors are liberated therefrom their toxic effect may be controlled within the desired limits.

Furthermore, the objects of our invention include the provision of a germicide and antiseptic which possesses no disagreeable odor, is free from deleterious effects upon the skin and mucous membranes of the user, and the effects of which may be controlled so that it is substantially non-toxic to the material treated. We also have in this invention provided a preservative which is economical of production and convenient in use and which may be kept in storage without the occurrence of undesirable changes therein.

We have found that furane derivatives such as furfuramide may be used as effective germicides or fungicides upon various organic materials, especially if such materials are accompanied by moisture. The moisture causes a decomposition of the furane derivative and the liberation of vapors having the desired germicidal or antiseptic effect. For example, furfuramide in moist air will decompose and liberate vapors comprising furfural and ammonia. However, under most conditions, furfuramide, furfurine and other furane derivatives in the presence of small amounts of moisture will decompose too rapidly thus producing vapors in quantities which may be strongly toxic to the plant or other host which is being treated. Furthermore, it is often difficult to uniformly distribute the pure powdered furfurine and furfuramide except in such quantities that the resulting furfurfal vapors will be of an excessive concentration injurious to the organic matter treated.

We have found that if furfurmide or furfurine are associated with quantities of inert material, such as infusorial earth or the like, they may be satisfactorily diluted and the germicidal vapors may be gradually liberated, but in quantities insufficient to render the vapors toxic to the plants or other organic matter treated.

As a fungicide on plants, we have found that furfuramide may be associated with infusorial earth in the proportion of fifty pounds of the furfuramide to fifty pounds of the inert earth. This material in dry finely divided form may be readily stored in a dry atmosphere without the occurrence of exothermic reactions or undersirable changes therein. When used, the powder may be blown or sprinkled over the plants or mixed with the seed. The natural moisture of the plants and surrounding atmosphere will be sufficient to slowly cause decomposition of the furfuramide, thus furfural and ammonia vapors will be liberated at the surface of the plants in a concentration depending upon the proportion of inert material which has been used. Since the vapors are liberated in very close proximity to the points where they are actually effective, this method is obviously very efficient and necessitates the use of only a small quantity of the material. Furthermore, the vapors being produced only gradually, the effect is prolonged over a substantial period of time and yet at no time are the vapors produced in sufficient concentration to have an excessive or injurious effect upon the plants.

The product may be made by merely mixing furfuramide or furfurine with the inert earth or if a very uniform and thorough incorporation of the furane derivative in the inert earth is desired the furfuramide may be precipitated directly in the inert earth in the desired quantities; a somewhat more stable product is then obtainable by heating the mixture to a temperature of 100°–120° C., whereby the furfuramide is converted to furfurine.

It will be apparent from the foregoing that the effective concentration of furfuramide, furfurine and other similar materials may be controlled in a like manner, regardless of the particular use for which these chemicals are intended, whether as germicides or as reagents in other processes or arts.

It is not intended that this invention be limited by the above specific description, but it is to be understood that we are to be limited only by the following claims or as may be required by the prior art.

Having thus described our invention, what we claim as new and desire to secure by Letters Patent of the United States, is:

1. The process of preserving organic material in the presence of natural moisture which comprises treating the material with a finely divided substance comprising furfuramide and inert earth whereby furfural vapor is gradually liberated as a result of the reaction of furfuramide with the moisture, excessive concentration of the furfuramide being avoided by the use of the inert earth.

2. The method of utilizing the germicidal and fungicidal properties of ammonia derivatives or furfural which comprises chemically liberating furfural vapors at a retarded rate and in close proximity to the material to be preserved.

3. The method of utilizing the germicidal and fungicidal properties of furane derivatives which comprises liberating vapors in a predetermined concentration in proximity to the material to be preserved by the reaction of moisture with furfuramide associated with inert earth.

4. The process of preserving organic material which comprises treating the material with an antiseptic comprising furfuramide associated with predetermined quantities of infusorial earth.

5. The process of preserving organic material which comprises treating the material with a disinfectant comprising an ammonia derivative of furfural that liberates furfural vapors associated with predetermined quantities of infusorial earth whereby furfural vapors are liberated in close proximity to the organic material to be preserved.

6. The process of preserving organic material which comprises treating the material with a disinfectant comprising a finely divided solid ammonia derivative of furfural that liberates furfural vapor associated with predetermined quantities of infusorial earth.

7. The process of preserving organic materials which comprises associating therewith quantities of finely divided furfuramide.

8. The process of preserving organic material in the presence of natural moisture which comprises treating the material with a substance comprising an ammonia derivative of furfural that liberates furfural vapors in the presence of said moisture and inert earth, whereby vapors of a furane derivative are gradually liberated as a result of reactions with the moisture.

9. A germicide and fungicide comprising an ammonia derivative of furfural which gradually decomposes in the presence of moisture and liberates furfural vapor in a controlled concentration.

10. A germicide and fungicide comprising inert earth associated with an ammonia derivative of furfural which liberates furfural vapor gradually under the conditions of use of the antiseptic.

11. A germicide and fungicide comprising furfuramide.

12. A germicide and fungicide comprising furfuramide associated with an inert carrier.

13. A germicide and fungicide comprising furfuramide associated with an inert earth in relative proportions such that the rate of decomposition of the furfuramide is retarded under the natural conditions of use of said preservative and antiseptic.

14. A germicide and fungicide comprising a furfuramide associated with infusorial earth.

15. A germicide and fungicide comprising an ammonia derivative of furfural which decomposes in the presence of natural moisture and liberates furfural vapors.

16. A germicide and fungicide comprising an ammonia derivative of furfural and inert earth, said derivative liberating furfural vapor.

In witness whereof, we have hereunto subscribed our names.

JOHN P. TRICKEY.
CARL S. MINER.